United States Patent [19]

Chow

[11] 4,364,410
[45] Dec. 21, 1982

[54] BI-DIRECTIONAL FLOW CONTROL SYSTEM

[75] Inventor: Peter C. M. Chow, Newark, Calif.

[73] Assignee: Grove Valve and Regulator Company, Calif.

[21] Appl. No.: 180,229

[22] Filed: Aug. 21, 1980

[51] Int. Cl.³ .......................................... G05D 16/00
[52] U.S. Cl. .................................... 137/489; 137/493
[58] Field of Search ............... 137/489, 491, 492, 493; 417/537

[56] References Cited

U.S. PATENT DOCUMENTS

| | | | |
|---|---|---|---|
| 619,534 | 2/1899 | Berrier | 417/537 |
| 1,078,126 | 11/1913 | Chadwick | 417/537 |
| 3,669,142 | 6/1972 | Gerbie | 137/489 |
| 4,135,697 | 1/1979 | Brumm | 137/489 X |

Primary Examiner—Alan Cohan
Attorney, Agent, or Firm—Melvin R. Stidham

[57] ABSTRACT

For use in a fluid system, which includes a control valve or the like having one port to which the higher of two pressures is delivered and another port from which fluid flows to the lower of two pressures, a four-way shuttle valve with high and low pressure ducts. Pressure level passages connected from the two pressure zones, are each connected by lateral transfer passages to both the high and low pressure ducts. One-way check valves in each of the four lateral passages enables flow only to the high pressure port and from the low pressure port. In the event of pressure reversal, the check valves will shift so that flow is always from the high pressure line to the high pressure duct of the shuttle valve.

4 Claims, 2 Drawing Figures

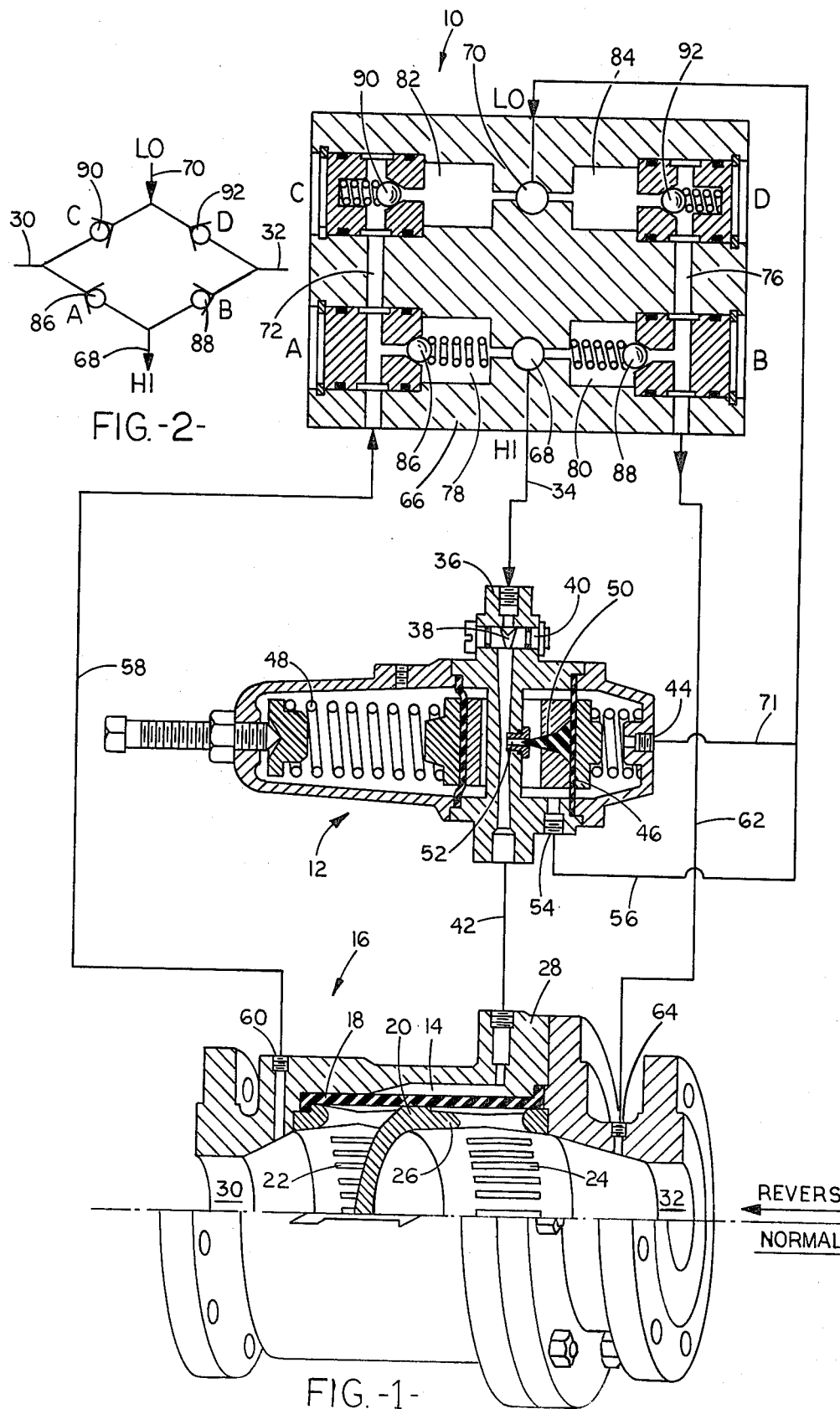

4,364,410

BI-DIRECTIONAL FLOW CONTROL SYSTEM

BACKGROUND OF THE INVENTION

Generally, a pilot or control valve in a pressure control system with a main shut-off valve has its inlet port connected to one side of the main valve and an exhaust line connected to the other side. For example, with a pilot valve controlling the jacket pressure of a main valve, the inlet port of the pilot valve is connected to the upstream side in the normal direction of flow and a dumping valve for evacuating the jacket is connected to the normal downstream side. However, in the event of pressure reversal this system becomes inoperative and, where pressure reversal is occasioned, bi-directional control requires the provision of two parallel control valves, manually switching devices or the like.

OBJECTS OF THE INVENTION

It is an object of this invention to provide a device which will automatically switch over the control lines of a control valve, regulator or the like upon a pressure reversal in the pipeline.

It is a further object of this invention to provide a shuttle valve device which will enable continued operation of a control valve despite pressure reversals in the pipeline.

Other objects and advantages of this invention will become apparent from the description to follow, particularly when read in conjunction with the accompanying drawing.

SUMMARY OF THE INVENTION

In carrying out this invention, I provide a valve body having generally parallel high and low pressure ducts extending therein intermediate the ends thereof. A pair of pipeline communication passages, which are connected to opposite sides of the main shut-off valve, extend into the shuttle valve body on opposite sides of, and transverse to, the high and low pressure ducts. These are then connected separately to the high and low pressure ducts by means of lateral passages. A one-way check valve in each of those lateral passages that are connected to the high pressure duct, enables flow only from the pipeline communication passages to the high pressure duct. Similarly a one-way check valve in each of those lateral passages that are connected to the low pressure duct, enables flow only from the low pressure duct to the pipeline communication passages. Hence, whatever the direction of flow, the shuttle valves will enable flow from the high pressure side of the main valve to the high pressure duct and from the low pressure duct to the low pressure side. The high pressure duct is connected to the inlet of a pilot valve which controls the jacket pressure of a main shut-off valve, and the low pressure duct is connected to the dumping port of the pilot valve so that when the jacket is evacuated, it automatically dumps to the low pressure side of the main valve.

BRIEF DESCRIPTION OF THE DRAWING

In the drawing:

FIG. 1 is a section view of a fluid control system incorporating the shuttle valve of this invention;

FIG. 2 is a schematic diagram of the shuttle valve operation.

DESCRIPTION OF A PREFERRED EMBODIMENT

Referring now to FIG. 1 with greater particularity, the shuttle valve 10 of this invention may be operated in conjunction with a pilot valve 12 that controls the pressure in the jacket 14 of a main valve of the type wherein the valve is opened when the higher line pressure overcomes pressure in the control chamber 14. For example, in the main valve 16 shown a flexible tube 18 is stretched around a dam or barrier 20 under slight hoop tension, which, augmented by the pressure in the jacket 14 opposes upstream pressure acting against it through a series of slots 22 or 24, depending upon the direction of flow, as indicated by the arrows "Normal" and "Reverse". The slots 22 and 24 are provided in a core or cage 26 which is carried in the valve body 28.

When the control pressure in the jacket 14 is so overcome, the tube stretches outward and flow occurs from the higher pressure side 30 or 32 through the slots 22 or 24, around the barrier 20 and out the other slots to the then downstream side.

In the pilot valve 12, upstream pressure is delivered through line 34 to the intake port 36, from which it is delivered through orifice 38 (the size of which may be varied by turning the plug 40) to load line 42 to load the jacket 14. Flow pressure fluid being controlled is fed to sensing port 44 where it acts against a diaphragm 46 opposed by an adjustable spring 48. When the spring 48 overcomes the pressure at the sensing duct port 44 a valve plug 50 is moved away from a port 52 to allow the chamber 14 to be dumped back through line 42 and out through dumping port 54 to a low pressure line 56.

In conventional operation, the intake port 36 is connected by line 58 from a port 60 in the usual upstream side of the valve 16 and the dumping port 54 is connected by line 62 from a port 64 in the downstream side of the valve. However, in a system wherein flow reversal is occasioned, the pilot valve 12 is rendered inoperative. Therefore, the shuttle valve 10 of this invention is interposed in the system.

The shuttle valve 10 includes a valve body 66 in which are bored high and low pressure ducts 68 and 70. As shown, the high pressure duct 68 is connected by line 34 to the intake port 36 of the pilot valve and the low pressure duct 70 is connected by line 56 from the dumping port 54 of the pilot valve. Since low pressure duct 70 carries the lower of two pressures in the system, i.e. the downstream pressure at any given moment, the sensing port 44 may also be connected to line 56 by sensing line 71, for control of downstream pressure. Pipeline communication or pressure level passages 72 and 76 are brought into communication with the opposite sides of the main valve 16 by connection through lines 58 and 62. The pipeline communication passages 72 and 76 extend into the valve body 66 on opposite sides of, and transverse to, the high and low pressure ducts 68 and 70. High pressure transfer lines 78 and 80 extend outward in opposite directions from high pressure duct 68 to communicate with the pipeline pressure level lines 72 and 76. Low pressure transfer lines 82 and 84 extend outward from the low pressure duct 70 to the pipeline pressure level passages 72 and 76. One-way check valves 86 and 88 are interposed in the high pressure transfer lines 78 and 80 to enable flow only from the pipeline pressure level passages 72 and 76 to the high pressure duct 68. One-way check valves 90 and 92 in the low pressure transfer lines enable flow only from the low pressure duct 70 to the pipeline pressure passages 72 and 76.

In operation, assuming that flow passage 30 represents the high pressure side of the valve 16, the check valve 86 will be opened to allow flow of high pressure fluid to the high pressure duct 68, and through the line 34 to the intake port of the pilot valve 12 to load the control chamber 14 of the main valve 16. In the meantime, the higher pressure in pipeline pressure level passage 72 holds the check valves, 88 and 90 firmly against their seats to prevent flow from the lower pressure passage line 76 to the high pressure duct 68. Therefore, flow from the low pressure duct 70 can only be through check valve 92 to the pipeline pressure level line 62. In actual operation a state of balance is reached wherein the dumping valve 52 is partially open to permit a certain amount of dumping at port 54 continuously for continuous flow through the valve 16.

In the event that flow in the pipeline (not shown) reverses and flow passage 32 becomes the high pressure side, the check valve 88 is immediately unseated to enable flow from line pressure passage 76 to the high pressure duct 68, biasing check valves 86 and 92 firmly against their seats so that low pressure flow from the low pressure duct 70 is possible only through check valve 90 to line pressure passage 72.

The operation is illustrated schematically in FIG. 2. Assuming that pressure in line 30 is the higher of two pressures, it will unseat check valve 86 and seat check valves 90 and 88 so that flow from line 30 is out through high pressure duct 68 and flow from low pressure duct 70 enabled only through check valve 92 to line 32. Should pressure reverse, and flow passage 32 become the higher, it will unseat check valve 88 and seat check valves 92 and 86 so that flow from line 32 goes out through high pressure duct 68. Flow from low pressure duct 70 is enabled only through check valve 90 to flow passage 30.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. A bi-directional pipeline pressure control system comprising:
   a main control valve adapted for connection into a pipeline and having flow passages at opposite ends thereof and a pressure control chamber;
   a pilot valve for said control chamber including an inlet port connected to a high pressure line, a load port connected to said pressure control chamber; and a dumping port connected to a low pressure line;
   a first pair of branch lines connected between one of said main valve flow passages and said high and low pressure lines;
   a second pair of branch lines connected between the other of said main valve flow passages and said high and low pressure lines; and
   first and second pairs of one-way check valves in said first and second pairs of branch lines, one check valve of each pair thereof being conditioned to enable flow only from one of said main valve flow passages to said high pressure line and the other of said pair being conditioned to enable flow only from said low pressure line to said one main valve flow passage.

2. A bi-directional pipeline pressure control system comprising:
   a fluid flow conduit including a main control valve;
   a pressure control chamber in said main control valve;
   a pilot valve for said control chamber including an inlet port connected to a high pressure line, a load port connected to said pressure control chamber; and
   a dumping port connected to a low pressure line;
   a first pair of branch lines connected between said fluid flow conduit, on one side of said main control valve, and said high and low pressure lines;
   a second pair of branch lines connected between said fluid flow conduit, on the other side of said main control valve, and said high and low pressure lines; and
   first and second pairs of one-way check valves in said first and second pairs of branch lines, one check valve of each pair thereof being conditioned to enable flow only from the upstream side of said main control valve to said high pressure line and the other of said pair being conditioned to enable flow only from said low pressure line to the downstream side of said main control valve.

3. The bi-directional pipeline pressure control system defined by claim 2 including:
   a shuttle valve body;
   high and low pressure ports opening in said valve body intermediate the ends thereof and connected to said load and dumping ports, respectively;
   first and second pressure zone communication passages connected to said fluid flow conduit on opposite sides of said main control valve and extending into said shuttle valve body on opposite sides of said pressure ports;
   first and second outlet passages extending outward from said low pressure port to said first and second pressure zone communication passages;
   first and second intake passages extending inward from said first and second pressure zone communication passages to said high pressure port;
   said first and second pressure zone communication passages forming, with passages connected thereto, said first and second pair of branch lines;
   a one-way outlet check valve in each of said outlet passages enabling flow only from said low pressure port; and
   a one-way inlet check valve in each of said intake passages enabling flow only to said high pressure port.

4. The system defined by claim 3 wherein:
   said valve body is a solid block;
   said high and low pressure ports extend into said block in one direction without intersecting; and
   said communication passages extend into said body in a transverse direction across the planes of said pressure ports.

* * * * *